United States Patent
Hagiwara et al.

(10) Patent No.: US 12,017,310 B2
(45) Date of Patent: Jun. 25, 2024

(54) STAKING ASSEMBLY, STAKING ASSEMBLY MANUFACTURING METHOD, HUB UNIT BEARING, HUB UNIT BEARING MANUFACTURING METHOD, AUTOMOBILE, AND AUTOMOBILE MANUFACTURING METHOD

(71) Applicant: NSK LTD., Tokyo (JP)

(72) Inventors: Nobuyuki Hagiwara, Fujisawa (JP); Sonji Ryu, Fujisawa (JP)

(73) Assignee: NSK LTD., Tokyo (JP)

( * ) Notice: Subject to any disclaimer, the term of this patent is extended or adjusted under 35 U.S.C. 154(b) by 219 days.

(21) Appl. No.: 17/418,942

(22) PCT Filed: Feb. 5, 2020

(86) PCT No.: PCT/JP2020/004339
§ 371 (c)(1),
(2) Date: Jun. 28, 2021

(87) PCT Pub. No.: WO2020/162492
PCT Pub. Date: Aug. 13, 2020

(65) Prior Publication Data
US 2023/0103394 A1 Apr. 6, 2023

(30) Foreign Application Priority Data
Feb. 5, 2019 (JP) .................. 2019-018459

(51) Int. Cl.
*B23P 11/00* (2006.01)
*B60B 27/00* (2006.01)
(Continued)

(52) U.S. Cl.
CPC ........ *B23P 11/005* (2013.01); *B60B 27/0078* (2013.01); *F16C 19/385* (2013.01);
(Continued)

(58) Field of Classification Search
CPC ................ B21K 1/40; B60B 2310/208; B60B 2310/2082; B60B 2310/314;
(Continued)

(56) References Cited

U.S. PATENT DOCUMENTS 5,226,738 A    7/1993  Valette et al.
5,822,860 A   10/1998  Wadsworth-Dubbert et al.
(Continued)

FOREIGN PATENT DOCUMENTS

EP    0 927 651 A2    7/1999
FR    2 808 056 A1   10/2001
(Continued)

OTHER PUBLICATIONS

Written Opinion for International Publication No. WO JP2020/004339 (Year: 2020).*
(Continued)

*Primary Examiner* — Christopher J Besler
(74) *Attorney, Agent, or Firm* — Sughrue Mion, PLLC

(57) ABSTRACT

Axial relative movement of an auxiliary member (30) and a hub body (22z) is performed, the hub body (22z) and an inner race (21) are combined with each other in an axial direction, and a part of the hub body (22z) deformed by a blade (33) of the auxiliary member (30) is disposed inside an engagement concave portion (26) of the inner race (21).

6 Claims, 13 Drawing Sheets

(51) Int. Cl.
*F16C 19/38* (2006.01)
*F16C 43/04* (2006.01)

(52) U.S. Cl.
CPC ........ *F16C 43/04* (2013.01); *B60B 2310/314* (2013.01); *B60B 2310/316* (2013.01); *F16C 2226/12* (2013.01); *F16C 2326/02* (2013.01)

(58) Field of Classification Search
CPC ....... B60B 2310/3142; B60B 2310/316; B23P 11/005; F16C 43/04; F16C 2226/12
See application file for complete search history.

(56) References Cited

U.S. PATENT DOCUMENTS

| | | | |
|---|---|---|---|
| 6,491,440 | B1 | 12/2002 | Sahashi et al. |
| 6,497,515 | B1 | 12/2002 | Sahashi et al. |
| 10,060,472 | B2 | 8/2018 | Ishibashi |
| 2007/0140611 | A1 | 6/2007 | Chifu et al. |
| 2017/0363149 | A1 | 12/2017 | Kaiser et al. |

FOREIGN PATENT DOCUMENTS

| | | |
|---|---|---|
| JP | 08-091187 A | 4/1996 |
| JP | 2001-001710 A | 1/2001 |
| JP | 2001-088510 A | 4/2001 |
| JP | 2003-130062 A | 5/2003 |
| JP | 2005-257012 A | 9/2005 |
| JP | 2006-112470 A | 4/2006 |

OTHER PUBLICATIONS

Extended European Search Report dated May 16, 2022 in European Application No. 20752300.2.
International Search Report for PCT/JP2020/004339 dated Apr. 14, 2020 [PCT/ISA/210].

* cited by examiner

STAKING ASSEMBLY, STAKING ASSEMBLY MANUFACTURING METHOD, HUB UNIT BEARING, HUB UNIT BEARING MANUFACTURING METHOD, AUTOMOBILE, AND AUTOMOBILE MANUFACTURING METHOD

CROSS REFERENCE TO RELATED APPLICATIONS

This application is a National Stage of International Application No. PCT/JP2020/004339 filed Feb. 5, 2020, claiming priority based on Japanese Patent Application No. 2019-018459, filed Feb. 5, 2019, the contents of which are incorporated herein by reference.

TECHNICAL FIELD

The present invention relates to a staking assembly, a staking assembly manufacturing method, a hub unit bearing, a hub unit bearing manufacturing method, an automobile including a hub unit bearing, and an automobile manufacturing method.

BACKGROUND ART

A vehicle wheel and a braking rotation body of an automobile are supported by a hub unit bearing to be rotatable with respect to a suspension device. FIG. 13 shows a structure of a hub unit bearing 1 described in U.S. Pat. No. 5,226,738. The hub unit bearing 100 has a configuration in which a hub 102 is rotatably supported on an inner radial side of an outer race 101 through a plurality of rolling elements 103. The outer race 101 includes a double row of outer race tracks 104a and 104b provided in an inner peripheral surface and a stationary flange 105 provided in an axially intermediate portion to support and fix the outer race 101 to a knuckle of the suspension device. The hub 102 includes a double row of inner race tracks 106a and 106b in an outer peripheral surface and includes a rotational flange 107 provided in an axial outer portion protruding outward in the axial direction in relation to the axial outer end surface of the outer race 101. The plurality of rolling elements 103 are arranged for each row between the double row of the outer race tracks 104a and 104b and the double row of the inner race tracks 106a and 106b in a rolling manner. With such a configuration, the hub 102 is rotatably supported on the inner radial side of the outer race 101.

Additionally, the "outside" in the axial direction means the left side of FIG. 13 which is the outside of the vehicle body in a state in which the hub unit bearing 1 is assembled to the automobile. In contrast, the "inside" in the axial direction means the right side of FIG. 13 which is the center side of the vehicle body in a state in which the hub unit bearing 1 is assembled to the automobile.

In the example shown in the drawings, the hub 102 is a combination of a hub body 108 and an inner race 109. The hub body 108 includes the inner race track 106a on the outside of the axial direction in the double row of the inner race tracks 106a and 106b in the outer peripheral surface of the axially intermediate portion and includes the rotational flange 107 in the axial outer portion. Further, the hub body 108 includes a fitting cylinder portion 110 having an outer diameter smaller than that of a portion adjacent to the outside of the axial direction in the axial inner portion existing on the inside of the axial direction in relation to the inner race track 106a on the outside of the axial direction.

The inner race 109 includes the inner race track 106b on the inside of the axial direction in the double row of the inner race tracks 106a and 106b in the outer peripheral surface. Such an inner race 109 is externally fitted to the fitting cylinder portion 110 while the axial outer end surface abuts against a step surface 111 existing in the axial outer end portion of the outer peripheral surface of the fitting cylinder portion 110. In this state, the axial inner end surface of the inner race 109 is held down by a staking portion 112 formed by plastically deforming a cylindrical portion extending in the axial direction from the axial inner end portion of the fitting cylinder portion 110 outward in the radial direction. With such a configuration, the separation of the inner race 109 with respect to the hub body 108 is prevented.

In the structure described in U.S. Pat. No. 5,226,738, if a force in which the staking portion 112 holds down the axial inner end surface of the inner race 109 is not sufficient, there is a possibility that relative slippage (displacement, creep) occurs between the hub body 108 and the inner race 109.

European Patent Application, Publication No. 0927651 describes a technique of preventing creep between the hub body and the inner race by roughening the surface roughness of a chamfered portion connecting the axial inner end surface and the inner peripheral surface of the inner race. Further, U.S. Pat. No. 5,822,860 describes a structure in which a chamfering dimension of a chamfered portion connecting the axial inner end surface and the inner peripheral surface of the inner race changes in the circumferential direction.

CITATION LIST

Patent Literature

[Patent Literature 1]
U.S. Pat. No. 5,226,738
[Patent Literature 2]
European Patent Application, Publication No. 0927651
[Patent Literature 3]
U.S. Pat. No. 5,822,860

SUMMARY OF INVENTION

Technical Problem

However, even in the structure described in European Patent Application, Publication No. 0927651, if a force in which the staking portion holds down the axial inner end surface of the inner race is not sufficient, there is a possibility that creep occurs between the hub body and the inner race. Particularly, in the case of the structure in which a gap exists between the chamfered portion of the inner race and the staking portion, it is not possible to obtain the creep prevention effect due to the roughening of the surface roughness of the chamfered portion.

In the structure described in U.S. Pat. No. 5,822,860, a force in which the staking portion holds down the axial inner end surface of the inner race becomes uneven in the circumferential direction. Accordingly, there is a possibility that the inner race may be distorted unevenly in the circumferential direction and the roundness of the inner race track may decrease. As a result, the bearing performance of the hub unit bearing may deteriorate.

An object of the present invention is to realize a staking assembly capable of preventing displacement between a first member and a second member and a structure of a hub unit bearing capable of reliably preventing creep from occurring between a hub body and an inner race.

Solution to Problem

According to an aspect of the present invention, there is provided a method of manufacturing a staking assembly including: preparing a first member, a second member including an engagement concave portion and a hole allowing the first member to be inserted thereinto, and an auxiliary member including a blade; combining the first member and the second member with each other in an axial direction; moving the auxiliary member and the first member relatively in an axial direction so that a part of the first member deformed by the blade of the auxiliary member in the axial relative movement is disposed inside the engagement concave portion of the second member; and forming a staking portion with respect to the second member in the first member.

According to an aspect of the present invention, there is provided a method of manufacturing a staking assembly including: preparing a first member, a second member including a concave portion and a hole allowing the first member to be inserted thereinto, and an auxiliary member; moving the auxiliary member and the first member relatively in an axial direction and including (a) combining the first member with the second member in the axial direction in accordance with the axial relative movement and (b) forming a convex portion engaging with the concave portion in accordance with the axial relative movement in the first member by the auxiliary member; and forming a staking portion with respect to the second member in the first member.

According to an aspect of the present invention, there is provided a staking assembly including: a first member; and a second member including a hole allowing the first member to be inserted thereinto and combined with the first member, wherein the second member includes a concave portion, and wherein the first member includes a staking portion with respect to the second member, a convex portion provided in an outer surface of the first member and engaging with the concave portion of the second member, and a groove provided in the outer surface of the first member and extending from the convex portion toward a front end of the staking portion.

According to an aspect of the present invention, there is provided a staking assembly including: a first member; and a second member including a hole allowing the first member to be inserted thereinto and combined with the first member, wherein the second member includes a concave portion, wherein the first member includes a staking portion with respect to the second member and a convex portion provided in an outer surface of the first member and engaging with the concave portion of the second member, wherein the concave portion of the second member includes a first surface intersecting an axial direction of the first member, wherein the convex portion of the first member includes a second surface parallel to the first surface of the concave portion, and wherein the first surface and the second surface are in close contact with each other in the axial direction.

According to an aspect of the present invention, there is provided a hub unit bearing including: an outer race including an outer race track; a hub including an inner race track; and a plurality of rolling elements arranged between the outer race track and the inner race track, wherein the hub includes a hub body including an outer surface and an inner race disposed on the outer surface of the hub body and held by the hub body, wherein the inner race includes a concave portion, and wherein the hub body includes a staking portion with respect to the inner race, a convex portion provided in the outer surface of the hub body and engaging with the concave portion of the inner race, and a groove provided in the outer surface of the hub body and extending from the convex portion toward a front end of the staking portion.

According to an aspect of the present invention, there is provided a method of manufacturing a hub unit bearing, wherein the hub unit bearing includes an outer race including an outer race track, a hub including an inner race track, and a plurality of rolling elements arranged between the outer race track and the inner race track and wherein the hub includes a hub body including an outer surface and an inner race disposed on the outer surface of the hub body and held by the hub body. The method includes: preparing the inner race including an engagement concave portion and an auxiliary member including a blade; combining the hub body and the inner race with each other in an axial direction; moving the auxiliary member and the hub body relatively in the axial direction so that a part of the hub body deformed by the blade in the axial relative movement is disposed inside the engagement concave portion of the inner race; and forming a staking portion with respect to the inner race in the hub body.

According to an aspect of the present invention, there is provided a hub unit bearing including: an outer race including a double row of outer race tracks provided in an inner peripheral surface; a hub including a double row of inner race tracks provided in an outer peripheral surface; and a plurality of rolling elements which are arranged for each row between the double row of the outer race tracks and the double row of the inner race tracks in a rolling manner. The hub includes an inner race and a hub body. The inner race includes an inner race track on the inside of an axial direction in the double row of the inner race tracks on the outer peripheral surface. The hub body includes an inner race track which is formed in an outer peripheral surface of an axially intermediate portion directly or through another member and is located on the outside of the axial direction in the double row of the inner race tracks, a fitting cylinder portion which exists on the inside of the axial direction in relation to the inner race track on the outside of the axial direction and to which the inner race is externally fitted, and a staking portion which is bent outward in a radial direction from an axial inner end portion of the fitting cylinder portion and holds down an axial inner end surface of the inner race. The inner race includes an engagement concave portion provided at one or a plurality of positions in a circumferential direction to open to the axial inner end surface and the inner peripheral surface. The hub body includes an engagement convex portion provided at one or a plurality of positions in the circumferential direction to engage with the engagement concave portion.

The hub body can further include a concave groove which is recessed inward in the axial direction and extends outward in the radial direction from a portion which is close to the outside of the engagement convex portion in the radial direction and in which a phase in the circumferential direction coincides with that of the engagement convex portion in an axial outer surface of the staking portion.

According to an aspect of the present invention, in order to manufacture the above-described hub unit bearing, there is provided a method of manufacturing the hub unit bearing including: press-fitting the inner race into the fitting cylinder portion of the hub body before forming the staking portion; allowing the engagement convex portion to engage with the engagement concave portion of the inner race while forming the engagement convex portion and the concave groove by pressing one or a plurality of positions in the circumferential direction of an outer peripheral surface of a radial outer portion of the cylindrical portion, extending inward in an axial direction from the fitting cylinder portion of the hub body before forming the staking portion, outward in the axial direction to be plastically deformed; and coupling and fixing the inner race and the hub body by plastically deforming the cylindrical portion outward in a radial direction to form the staking portion.

It is preferable to perform the press-fitting and the engaging at the same time. In this case, the inner race can be press-fitted into the fitting cylinder portion of the hub body before forming the staking portion by pressing the inner race, externally fitted to an axial inner end portion of the hub body before forming the staking portion, outward in the axial direction by a portion deviating from a protrusion portion in a pressing punch including the protrusion portion protruding inward in the radial direction at one or a plurality of positions of the inner peripheral surface in the circumferential direction and the engagement convex portion can be allowed to engage with the engagement concave portion of the inner race while forming the engagement convex portion by pressing one or a plurality of positions in the circumferential direction of the radial outer portion of the cylindrical portion outward in the axial direction to be plastically deformed by the protrusion portion.

Further, since the pressing punch includes a pressing surface on a front end surface, a gap can exist between a front end surface of the protrusion portion and a bottom surface of the engagement concave portion while the pressing surface comes into contact with a portion deviating from the engagement concave portion in an axial inner end surface of the inner race when performing the press-fitting and the engaging at the same time.

It is preferable to further include confirming whether or not the engagement convex portion engages with the engagement concave portion after the engaging. It is possible to perform an operation of confirming whether or not the engagement convex portion engages with the engagement concave portion by, for example, with naked eyes or diagnosing images photographed by a camera.

An automobile according to an aspect of the present invention includes the staking assembly or the hub unit bearing.

In an automobile manufacturing method according to an aspect of the present invention, the hub unit bearing is manufactured by the hub unit bearing manufacturing method of the present invention.

Advantageous Effects of Invention

According to the aspect of the present invention, for example, since the engagement convex portion of the hub body engages with the engagement concave portion of the inner race, it is possible to reliably prevent creep from occurring between the hub body and the inner race. Further, it is possible to prevent the staking assembly from being displaced between the first member and the second member.

DESCRIPTION OF EMBODIMENTS

Figure 1:
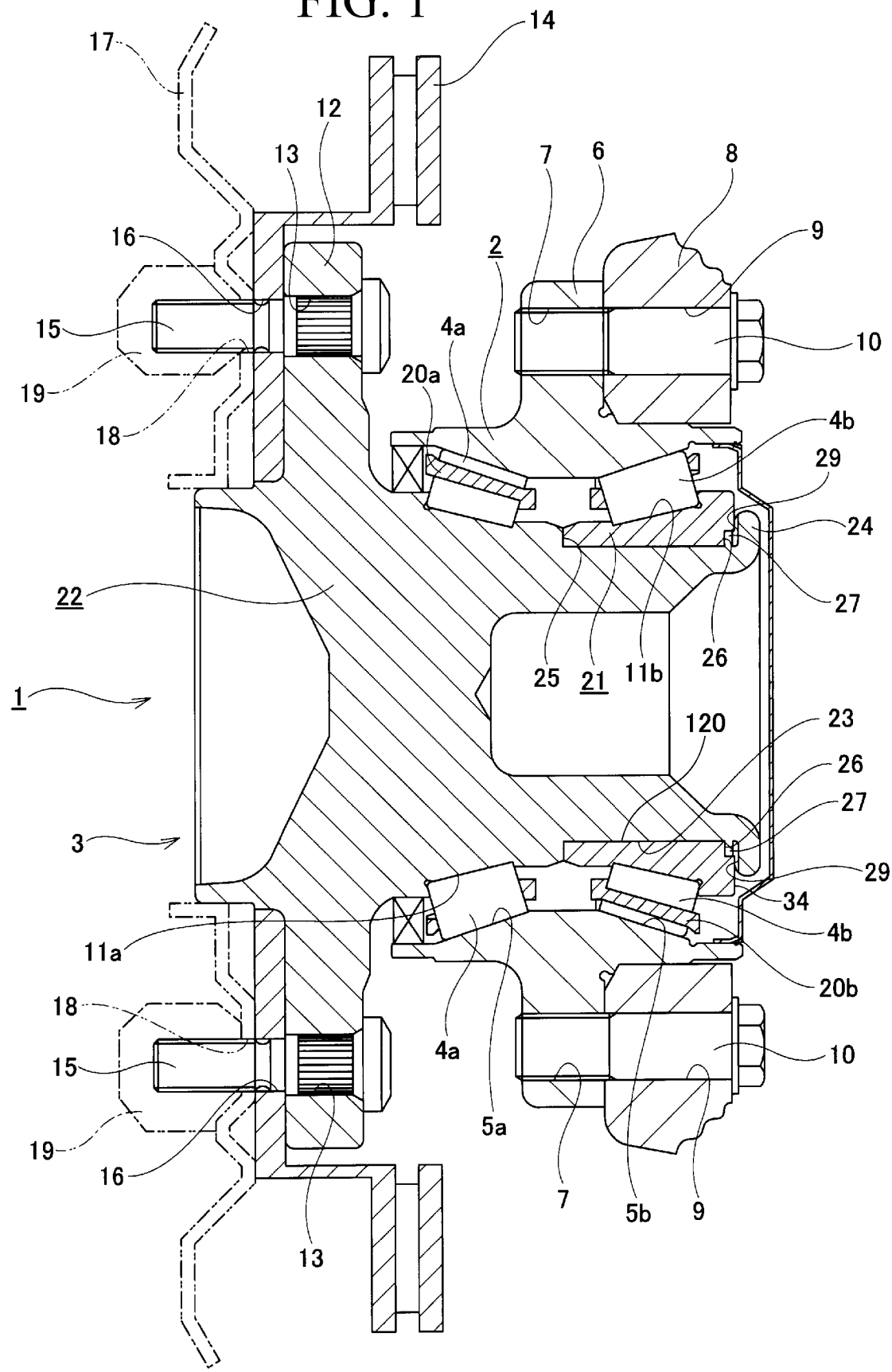
FIG. 1 is a cross-sectional view showing a hub unit bearing according to an embodiment of the present invention.
Figure 2:
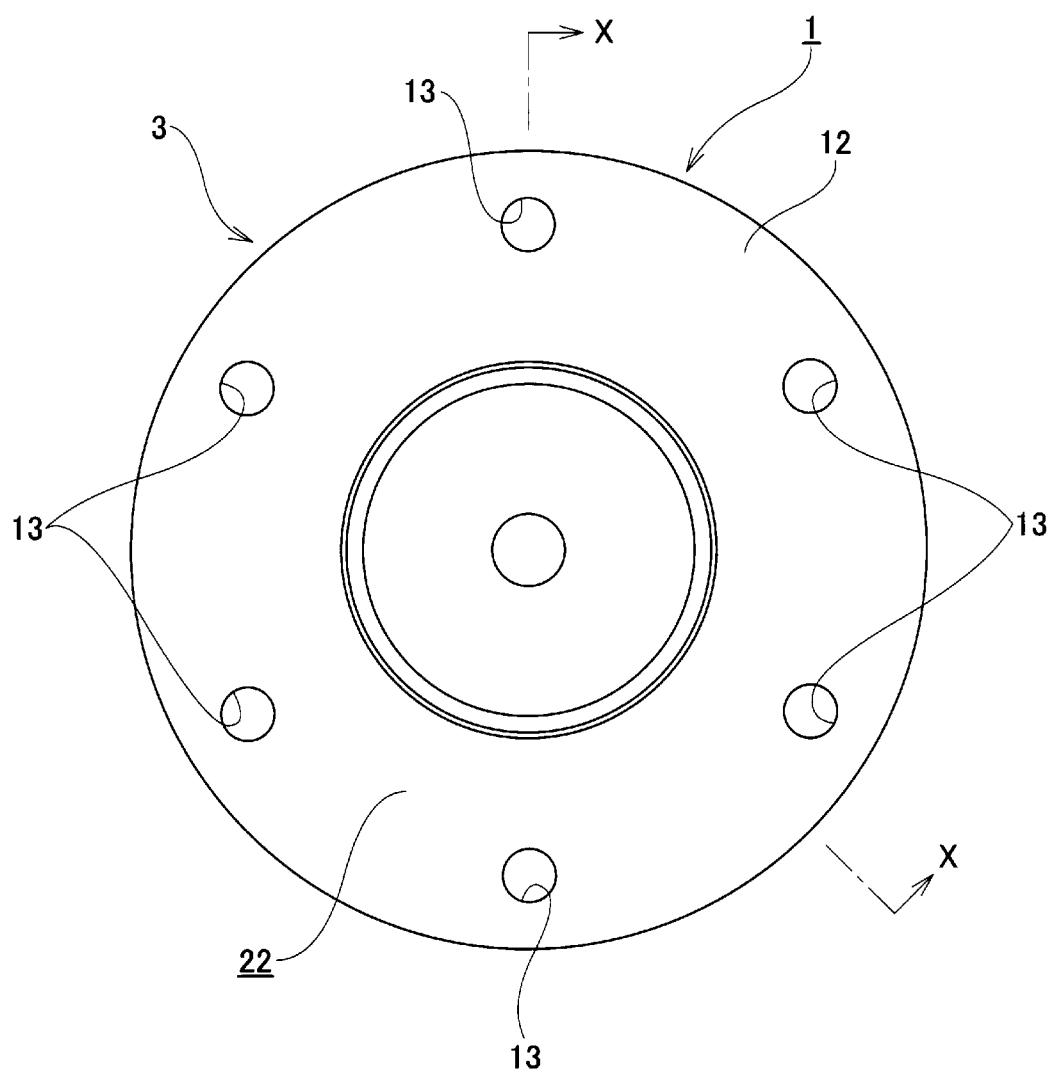
FIG. 2 is a cross-sectional view showing a state seen from the left side of FIG. 1 when a braking rotation body and a stud are omitted.

FIGS. 1 to 10 show an embodiment of the present invention. In the example of the drawings, a hub unit bearing 1 has a configuration in which a hub 3 is rotatably supported on the inner radial side of an outer race 2 through a plurality of rolling elements 4a and 4b. The hub unit 1 includes the outer race 2 which has outer race tracks 5a and 5b, the hub (staking assembly) 3 which has inner race tracks 11a and 11b, and a plurality of rolling elements 4a and 4b which are disposed between the outer race tracks 5a and 5b and the inner race tracks 7a and 7b.

The outer race 2 includes a double row of the outer race tracks 5a and 5b and a stationary flange 6. In an example, the outer race 2 is made of hard metal such as medium carbon steel. In another example, the outer race 2 can be made of another material. The double row of the outer race tracks 5a and 5b are respectively formed in the inner peripheral surfaces of the axially intermediate portions of the outer race 2. The outer race tracks 5a and 5b have a partially conical concave surface inclined in a direction in which the diameter increases toward a direction away from each other in the axial direction. The stationary flange 6 is formed in the axially intermediate portion of the outer race 2 to protrude outward in the radial direction. The stationary flange 6 includes a support hole 7 which is a screw hole provided at a plurality of positions of the radially intermediate portion in the circumferential direction. The outer race 2 is supported and fixed to a knuckle 8 in such a manner that a bolt 10 inserted through a passage hole 9 formed in the knuckle 8 constituting a suspension device is screwed into the support hole 7 of the stationary flange 6 from the inside of the axial direction and is further tightened.

The hub (staking assembly, staking unit) 3 is disposed on the inner radial side of the outer race 2 to be coaxial with the outer race 2. The hub 3 includes a double row of the inner race tracks 11a and 11b and a rotational flange 12. The double row of the inner race tracks 11a and 11b are formed in a portion facing the double row of the outer race tracks 5a and 5b in the outer peripheral surface (outer surface) of the hub 3. The double row of the inner race tracks 11a and 11b have a partially conical convex surface inclined in a direction in which the diameter increases toward a direction away from each other in the axial direction. The rotational flange 12 is formed in a portion located on the outside of the axial outer end portion of the outer race 2 in the axial direction of the hub 3 to protrude outward in the radial direction. The rotational flange 12 includes an attachment hole 13 which is provided at a plurality of positions of the radially intermediate portion in the circumferential direction to penetrate in the axial direction. In the example of the drawings, a serration portion formed near a base end of a stud 15 is press-fitted into the attachment hole 13 in order to couple and fix a braking rotation body 14 such as a disc or a drum to the rotational flange 12. Further, an intermediate portion of the stud 15 is press-fitted into a passage hole 16 formed in the braking rotation body. Furthermore, a nut 19 is screwed into a male screw portion formed at a front end portion of the stud 15 and is further tightened while the male screw portion is inserted through a passage hole 18 formed in a wheel 17 in order to fix the wheel 17 constituting a vehicle wheel to the rotational flange 12.

Additionally, the "outside" in the axial direction means the left side of FIG. 1 and the lower side of FIGS. 3 to 10 corresponding to the outside of the vehicle body while the hub unit bearing 1 is assembled to the automobile. In contrast, the "inside" in the axial direction means the right side of FIG. 1 and the upper side of FIGS. 3 to 10 corresponding to the center side of the vehicle body while the hub unit bearing 1 is assembled to the automobile. Further, the attachment hole 13 is not shown in FIGS. 3, 4, 6, 8, and 10.

Each of the rolling elements 4a and 4b is disposed at a plurality of positions between the double row of the outer race tracks 5a and 5b and the double row of the inner race tracks 11a and 11b in a rolling manner while being held by cages 20a and 20b. In an example, each of the rolling elements 4a and 4b is made of hard metal such as bearing steel or ceramics. In another example, the rolling elements 4a and 4b can be made of another material. With such a configuration, the hub 3 is rotatably supported on the inner radial side of the outer race 2. Further, in the example of FIG. 1, tapered rollers whose outer diameter gradually increases from one end to the other end in the axial direction are used as the rolling elements 4a and 4b.

The hub (staking assembly) 3 is substantially a combination of an inner race (second member) 21 and a hub body (first member) 22. The hub 3 includes a hub body 22 having an outer peripheral surface (outer surface) 23a and an inner race 21 disposed on the outer peripheral surface (outer surface) 23a of the hub body 22 and held by the hub body 22.

The inner race 21 includes the inner race track 11b on the inside of the axial direction on the outer peripheral surface in the double row of the inner race tracks 11a and 11b. In an example, the inner race 21 is made of hard metal such as bearing steel. In another example, the inner race 21 can be made of another material.

Figure 10:
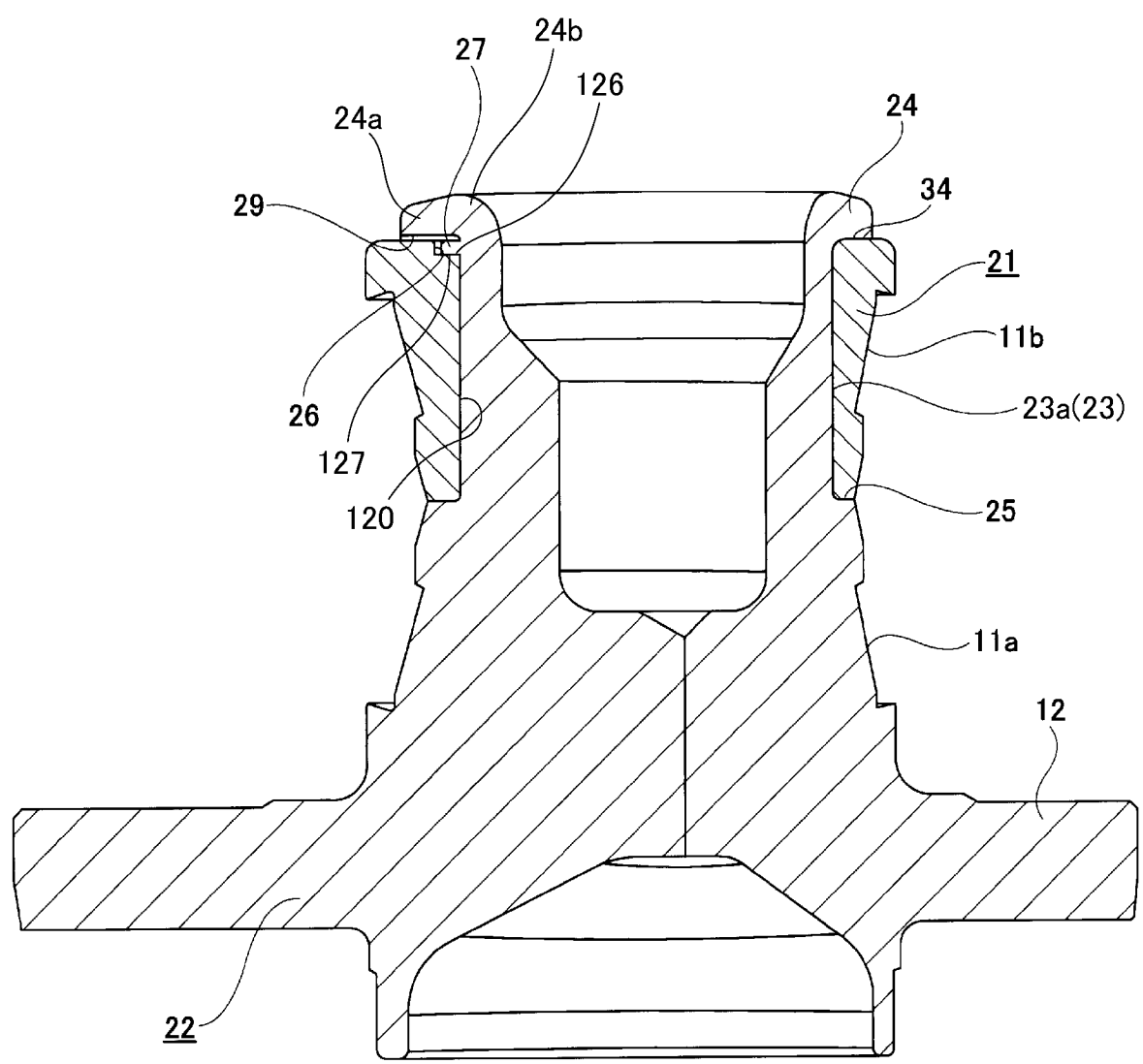
FIG. 10 is a view corresponding to a cross-section X-X of FIG. 2, which shows a state in which a hub is taken out.

The hub body 22 includes the inner race track 11a on the outside of the axial direction on the outer peripheral surface of the axially intermediate portion in the double row of the inner race tracks 11a and 11b. Further, the hub body 22 includes the rotational flange 12 which is provided in the outer portion in the axial direction and exists on the outside of the axial direction in relation to the inner race track 11a on the outside of the axial direction. In an example, the hub body 22 is made of hard metal such as medium carbon steel. In another example, the hub body 22 can be made of another material. Further, the hub body 22 includes a fitting cylinder portion (cylinder portion) 23 which is provided in the axial inner portion existing on the inside of the axial direction in relation to the inner race track 11a on the outside of the axial direction so that an outer diameter is smaller than that of a portion near the outside of the axial direction and the inner race 21 is externally fitted thereto. Furthermore, the hub body 22 includes a staking portion (swage portion, crimp portion) 24 which is bent outward in the radial direction from the axial inner end portion of the fitting cylinder portion 23 and holds down an axial inner end surface 34 of the inner race 21. For example, the hub 3 is configured such that the inner race 21 is sandwiched from both side of the axial direction between the axial outer surface of the staking portion 24 and a step surface 25 facing the inside of the axial direction and existing in the axial outer end portion of the fitting cylinder portion 23 while the inner race 21 is externally fitted to the fitting cylinder portion 23 of the hub body 22 and the inner race 21 and the hub body 22 are coupled and fixed to each other. In an example, the hub body 22 includes the staking portion 24 (the staking portion 24 for holding the inner race 21) with respect to the inner race 21. The cylinder portion 23 of the hub body 22 includes a peripheral wall of which a thickness of at least a part changes along the axial direction. In the peripheral wall of the cylinder portion 23, one end (first axial end) of the inner race 12 in the axial direction is disposed at a first portion (thick part) having a relatively large wall thickness and the other end (second axial end) of the inner race 21 in the axial direction is disposed at a second portion (thin part) having a relatively small wall thickness. The second portion of the peripheral wall of the hub body 22 is provided with the staking portion 24 having a bend extending in the circumferential direction and covering the axial end portion (second axial end) of the inner race 21. The staking portion 24 includes a holding portion (staking flange (swage flange, crimp flange), ring edge) 24a which extends in the radial direction and the circumferential direction and has a circular shape as a whole and a curved portion (bent portion, connection portion) 24b which connects the radial inner end portion of the holding portion 24a and the axial inner end portion of the cylinder portion 23 (FIG. 10).

In this embodiment, a plurality of concave portions (engagement concave portions, concave grooves, recesses, engagement recesses, key grooves) 26 provided in the inner race 21 respectively engage with a plurality of convex portions (engagement convex portions, protrusions, keys) 27 provided in the hub body 22 so that the relative rotation (creep) between the inner race 21 and the hub body 22 is prevented. The engagement concave portions 26 are formed at a plurality of positions (in the example shown in the drawings, four positions) in the circumferential direction of the inner race 21 so as to open to the inner peripheral surface of the axial inner end portion and the axial inner end surface 34 of the inner race 21. In other words, the engagement concave portion 26 opens inward in the radial direction and outward in the axial direction. The engagement convex portion 27 is formed at a plurality of positions in the circumferential direction of the axial inner end portion of the fitting cylinder portion 23 of the hub body 22 to protrude outward in the radial direction. For example, as will be described later, the engagement convex portion 27 can be formed by subjecting an outer peripheral surface of a cylindrical portion 28 constituting a hub body 22z before forming the staking portion 24 to a protruding process (local shaving process). As shown in FIG. 10, the staking portion 24 is formed by plastically deforming the cylindrical portion 28 outward in the radial direction. The phase in the circumferential direction of the axial outer surface of the staking portion 24 coincides with that of the engagement convex portion 27. The phase in the circumferential direction of the concave portion 26 of the inner race 21 coincides with that of the engagement convex portion 27. A concave groove 29 which extends outward in the radial direction and is recessed inward in the axial direction is formed over the radial direction from a portion adjacent to the outside of the engagement convex portion 27 in the radial direction.

In other words, the hub body 22 has a shaft shape along a predetermined axial direction. The inner race 21 includes a hole 120 into which the hub body 22 is inserted and the concave portion 26 which is provided in a part of the circumferential direction in the wall surface (inner surface, inner peripheral surface) facing the hole 120. The hub body 22 includes the convex portion 27 which is provided in a part of the outer surface 23a in the circumferential direction and engages with the concave portion 26 of the inner race 21 and the groove (processed groove, processing mark) 29 which is provided in the outer surface 23a and extends from the convex portion 27 toward the front end of the staking portion 24. One end (first end) of the groove 29 in the extension direction is located at one end of the convex portion 27 or in the vicinity thereof in the hub body 22. The other end (second end) of the groove 29 in the extension direction is disposed at a position closer to the front end of the staking portion 24 than the convex portion 27. In an example, the extension direction of the groove 29 is parallel to the center axis of the hub body 22. The convex portion 27 and the groove 29 are linearly arranged side by side on one line along the extension direction of the groove 29. In an example, the first end and the second end of the groove 29 may have different step shapes in the extension direction. The groove 29 is provided in both the holding portion 24a and the curved portion 24b of the staking portion 24. In another example, the groove 29 is provided in the curved portion 24b of the staking portion 24. In another example, the groove 29 is not provided in the staking portion 24. The groove 29 provided in the staking portion 24 can be advantageous in preventing the staking portion 24 from being broken or cracked in forging (plastic deforming, heading, press forming, bending) for forming the staking portion 24.

Figure 7:
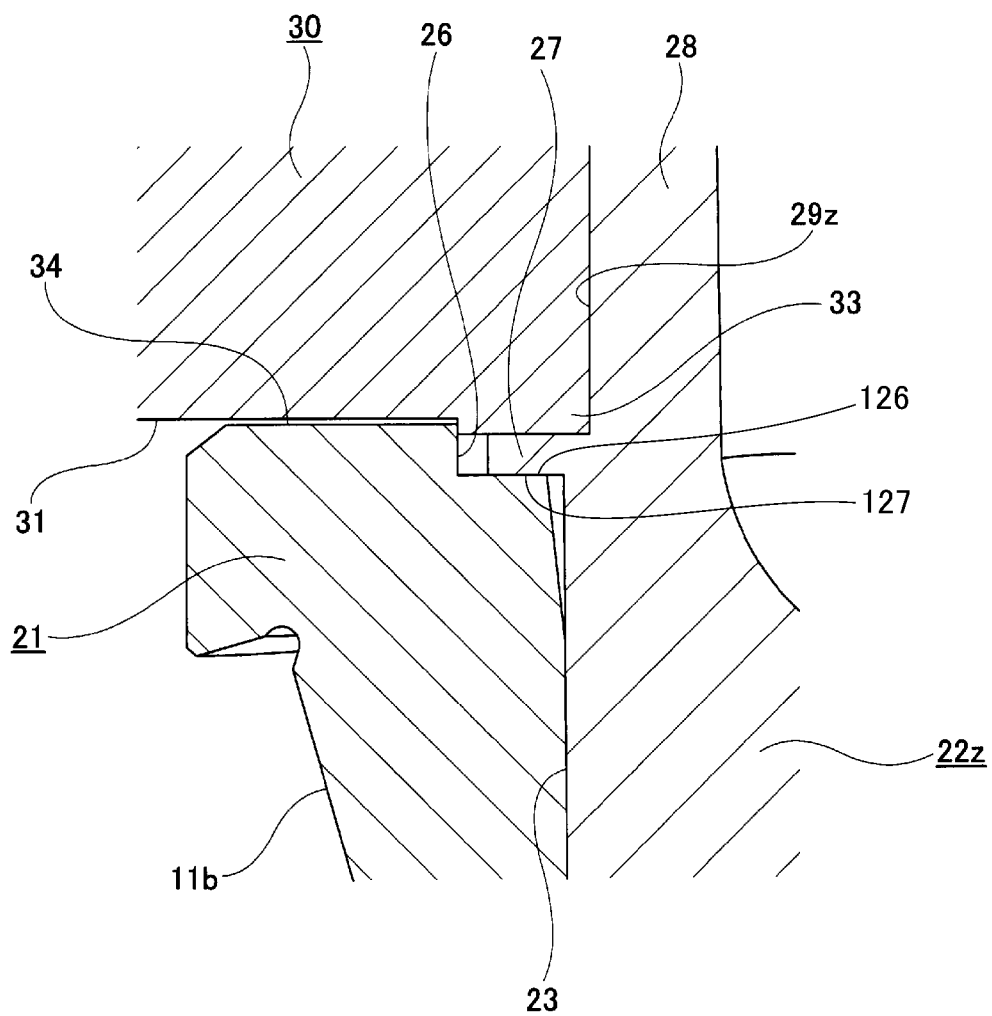
FIG. 7 is an enlarged view of a Z part of FIG. 6.
Figure 9:
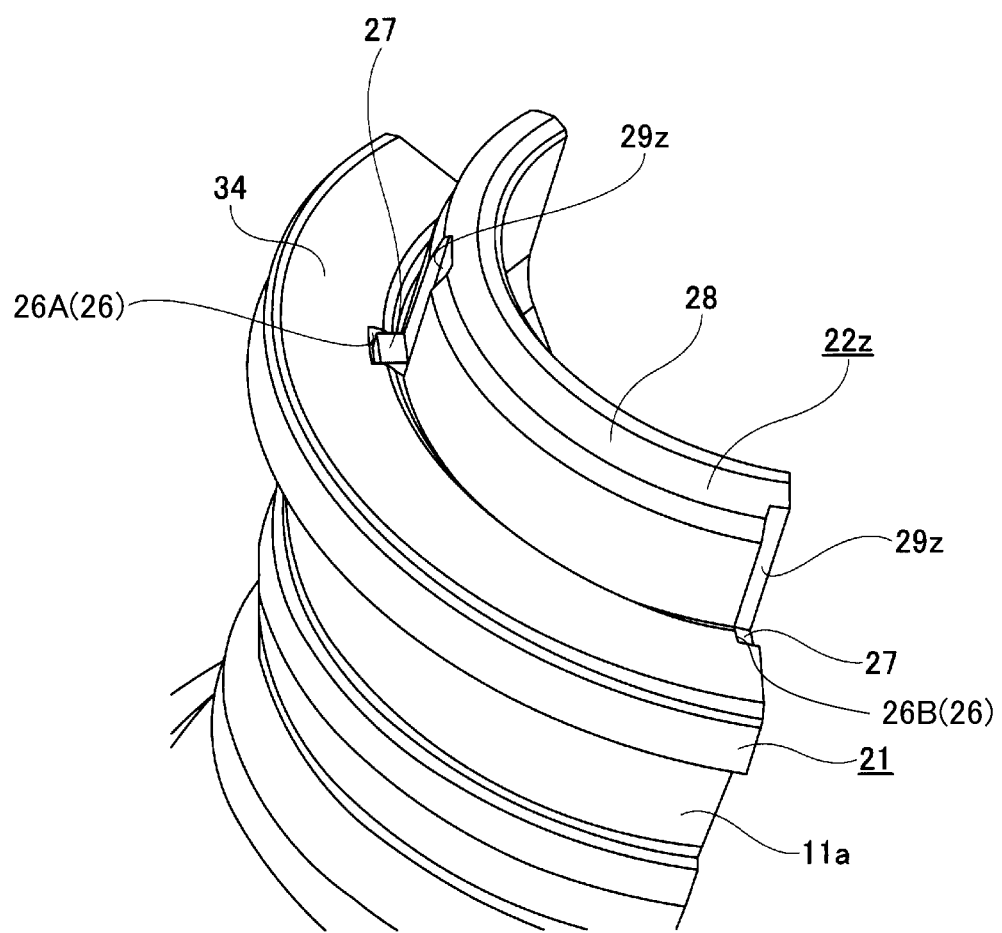
FIG. 9 is a perspective view showing a state in which the press-fitting step and the engaging step are completed when viewed from the inside of the axial direction.

The concave portion 26 of the inner race 21 includes a bottom surface (first surface) 126 which intersects (for example, perpendicular to) the axial direction of the hub body 22 (FIG. 7). The convex portion 27 of the hub body 22 includes a facing surface (second surface) 127 which is parallel to the first surface 126 of the concave portion 26. The first surface 126 and the second surface 127 are in close contact with each other in the axial direction. The number of the concave portions 26 arranged in the circumferential direction can be, for example, 1, 2, 3, 4, 5, 6, 7, 8, 9, 10, or more. The number of the convex portions 27 arranged in the circumferential direction can be, for example, 1, 2, 3, 4, 5, 6, 7, 8, 9, 10, or more. The inner race 21 includes a plurality of recesses which are arranged as the concave portions 26 to be away from each other. For example, the plurality of recesses include a first recess 26A and a second recess 26B which are adjacent to each other (FIG. 9). In an example, the distance between the first recess 26A and the second recess 26B (the peripheral surface length between two adjacent recesses in the circumferential direction (hereinafter, peripheral surface length)) is twice or more the horizontal width (the width (hereinafter, recess width) of the recess in the circumferential direction) of the first recess 26A (or the second recess 26B). For example, the recess width can be set to ½, ⅓, ¼, ⅕, ⅙, ⅐, ⅛, ⅑, ⅒, or less of the peripheral surface length. An area provided with the concave portion 26 on the inner surface of the inner race 26 is a partial area. For example, the circumferential length of the area provided with the concave portion 26 on the inner surface of the inner race 26 can be 30%, 25%, 20%, 15%, 10%, or 5% or less of the entire circumferential length.

The hub (staking assembly) 3 and the hub unit bearing 1 described above can be manufactured as below. First, the inner race 21 including the inner race track 11b on the inside of the axial direction and the plurality of engagement concave portions 26 is obtained by subjecting a metal material to necessary processing such as forging or grinding. For example, the inner race 21 can be obtained by forging a metal material to form the rough shape of the inner race 21 and then performing a finishing process such as grinding on the outer peripheral surface to form the inner race track 11b on the inside of the axial direction. The engagement concave portion 26 can be formed at the same time when the rough shape of the inner race 21 is formed by forging the metal material. Alternatively, the engagement concave portion 26 can be formed by cutting after forming the rough shape of the inner race 21. As will be described later, the convex portion 27 engaging with the concave portion 26 is disposed in the concave portion 26 along with the formation of the convex portion 27. In this procedure, for example, the volume of the convex portion 27 disposed in the concave portion 26 gradually increases. This engagement technique has advantages of eliminating the need for high dimensional accuracy for the concave portion 26. For example, in the formation of the concave portion 26, cutting can be avoided and forging with dies can be easily applied.

Figure 3:
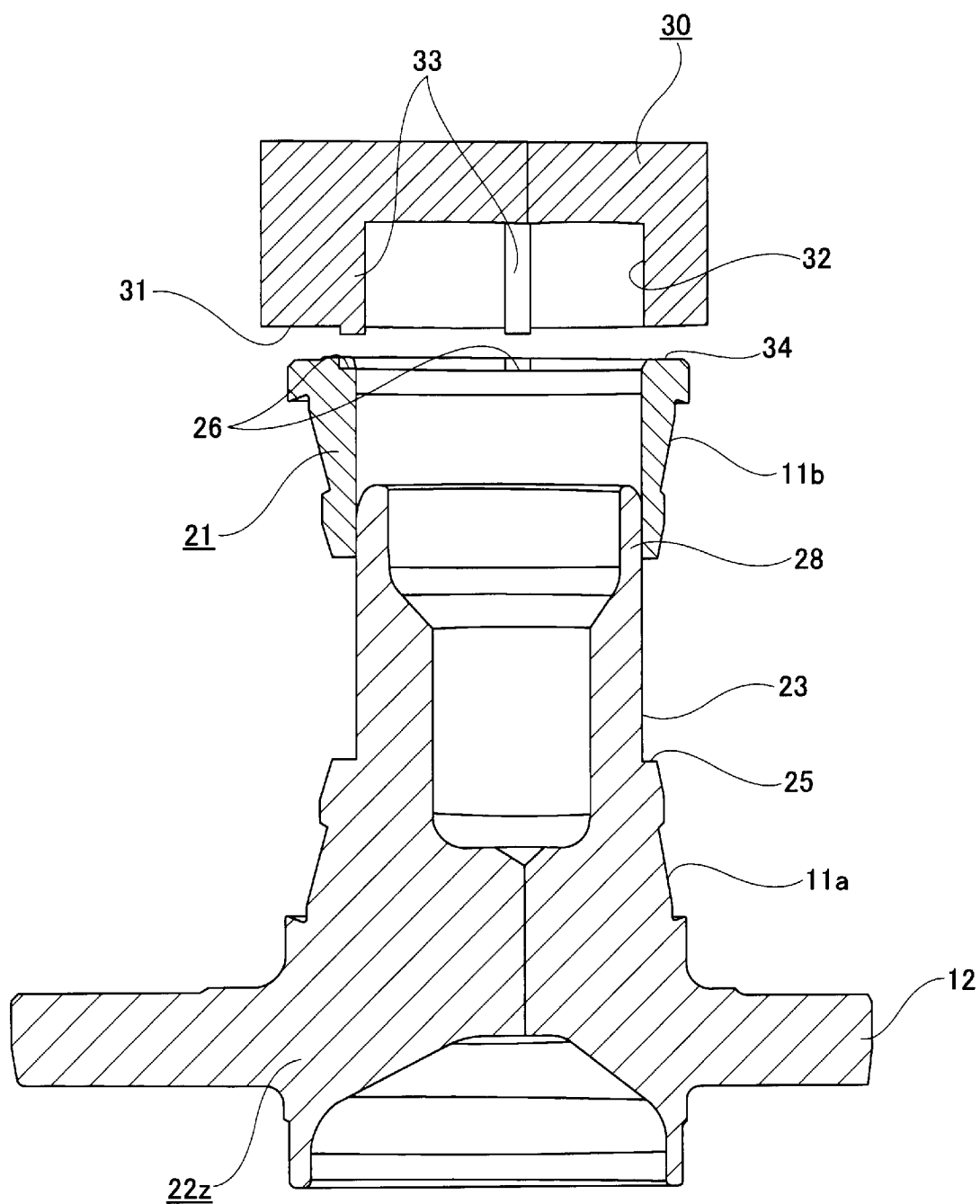
FIG. 3 is a view corresponding to a cross-section X-X of FIG. 2, which shows a state before an axial outer end portion of an inner race is externally fitted to an axial inner end portion of a hub body before forming a staking portion and an axial inner end surface of the inner race is pressed by a pressing punch.

Further, the hub body 22z before forming the staking portion 24 shown in FIG. 3 is obtained by performing necessary processing such as forging or grinding on a metal material. That is, the hub body 22z includes the inner race track 11a which is on the outside of the axial direction, the rotational flange 12, the fitting cylinder portion 23 and the step surface 25, and the cylindrical portion 28 extending inward in the axial direction from the axial inner end portion of the fitting cylinder portion 23. For example, the outer peripheral surface of the fitting cylinder portion 23 and the outer peripheral surface of the cylindrical portion 28 exist on the same cylindrical surface. The hub body 22z can be obtained by forging a metal material to form the rough shape of the hub body 22z and performing a finishing process such as grinding on the outer peripheral surface.

Next, the hub body 22z is supported on a support base (not shown) with the axial outer end portion facing downward and the axial inner end portion facing upward. Then, the rolling element 4a of the outer row in the axial direction is disposed around the inner race track 11a on the outside of the axial direction in the hub body 22z to be held by the cage 20a on the outside of the axial direction. Further, the outer race 2 is disposed around the axially intermediate portion of the hub body 22z. Additionally, the outer race 2, the rolling elements 4a and 4b, and the cages 20a and 20b are omitted in FIGS. 3 to 10.

Next, the rolling element 4b of the inner row in the axial direction is disposed around the inner race track 11b on the inside of the axial direction in the inner race 21 to be held by the cage 20b on the inside of the axial direction. Then, as shown in FIG. 3, the axial outer end portion of the inner race 21 is externally fitted (lightly press-fitted) to the axial inner end portion of the cylindrical portion 28 of the hub body 22z. At this time, the engagement concave portion 26 of the inner race 21 and a protrusion portion (blade) 33 of the pressing punch 30 disposed above the support base to be displaced in the vertical direction are set such that the phases in the circumferential direction coincide with each other.

Figure 4:
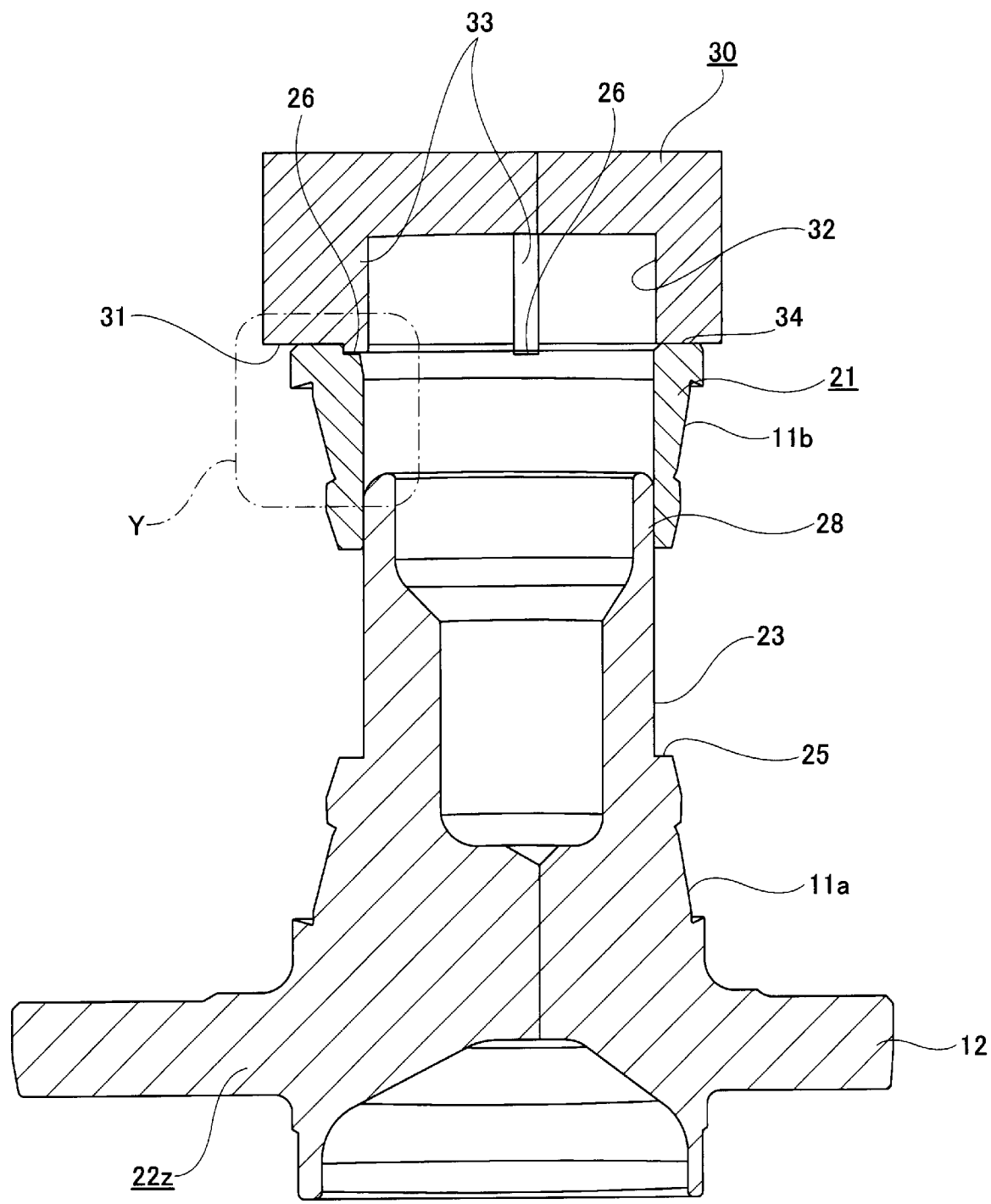
FIG. 4 is a view corresponding to a cross-section of X-X of FIG. 2, which shows a state in which the pressing punch is displaced downward from the state shown in FIG. 3 and a front end surface of the pressing punch comes into contact with the axial inner end surface of the inner race.

Next, as shown in FIGS. 3 and 4, the pressing punch 30 is lowered so that a pressing surface 31 provided in the pressing punch 30 comes into contact with the axial inner end surface (axial end surface) 34 of the inner race 21. The protrusion portion (blade) 33 of the pressing punch 30 is aligned to the engagement concave portion 26 of the inner race 21 in the circumferential direction. The pressing punch 30 includes a concave portion 32 which opens to the center portion of the lower surface (front end surface) and has a circular shape when viewed from below and includes the pressing surface 31 which is provided around the concave portion 32 in the lower surface. Further, the pressing punch 30 includes the protrusion portion 33 which is provided at a plurality of positions (for example, four positions) in the circumferential direction of the inner peripheral surface of the concave portion 32 to protrude inward in the radial direction. In an example, the protrusion portion 33 is formed in the inner peripheral surface of the concave portion 32 over the axial direction and the lower end portion (front end portion) protrudes downward in relation to the pressing surface 31. Further, the protrusion portion 33 includes a blade on the inner peripheral edge of the lower end surface and both side edges in the circumferential direction for performing a protruding process (local shaving process) on the outer peripheral surface of the cylindrical portion 28 as described later.

Figure 5:
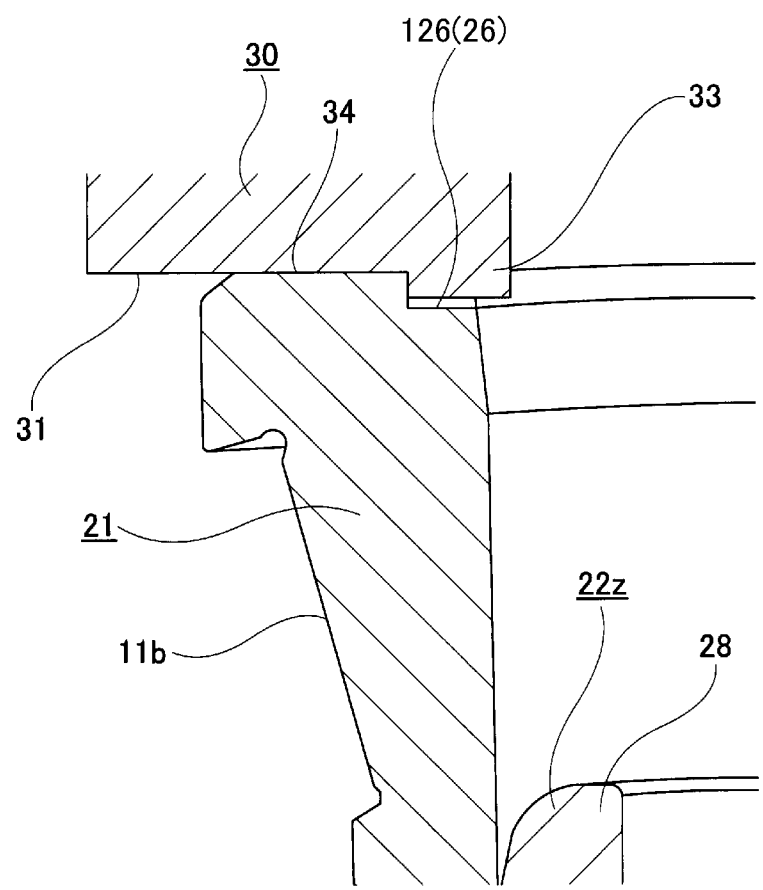
FIG. 5 is an enlarged view of a Y part of FIG. 4.

As shown in FIG. 5, the lower end portion of the protrusion portion 33 is disposed inside the engagement concave portion 26 while the pressing surface 31 of the pressing punch 30 comes into contact with the axial inner end surface 34 of the inner race 21. Further, the lower end surface of the protrusion portion 33 faces the bottom surface (the surface facing the inside of the axial direction) of the engagement concave portion 26 with a gap therebetween. In other words, when the phases in the circumferential direction (the circumferential positions) between the protrusion portion 33 of the pressing punch 30 and the engagement concave portion 26 of the inner race 21 coincide with each other, the pressing surface 31 of the pressing punch 30 comes into contact with the axial inner end surface 34 of the inner race 21. In contrast, when the phases in the circumferential direction between the protrusion portion 33 of the pressing punch 30 and the engagement concave portion 26 of the inner race 21 are displaced, the lower end surface of the protrusion portion 33 contacts the axial inner end surface 34 of the inner race 21 and a gap is formed between the pressing surface 31 and the axial inner end surface 34 of the inner race 21. Thus, it is possible to determine whether or not the phases in the circumferential direction between the protrusion portion 33 of the pressing punch 30 and the engagement concave portion 26 of the inner race 21 coincide with each other by determining whether or not the pressing surface 31 of the pressing punch 30 is in contact with the axial inner end surface 34 of the inner race 21 with naked eyes or by diagnosing images photographed by a camera. Alternatively, specifically, for example, as will be described later, it may be determined whether or not the phases in the circumferential direction between the protrusion portion 33 of the pressing punch 30 and the engagement concave portion 26 of the inner race 21 coincide with each other depending on the load applied to the pressing punch 30 when press-fitting the inner race 21 into the fitting cylinder portion 23 of the hub body 22z and/or forming the engagement convex portion 27 by a protruding process (local shaving process). In another example, the phases (circumferential positions) of the concave portion 26 and the protrusion portion 33 may be aligned by relatively rotating one of the pressing punch 30 and the inner race 21 (the hub body 22z) during press-fitting.

Additionally, the pressing punch 30 including the protrusion portion 33 can be integrally formed as a whole and the protrusion portion 33 can be provided by supporting and fixing a separate member to the inner peripheral surface of the concave portion 32 provided in the body portion. If the protrusion portion 33 is provided by supporting and fixing the separate member to the body portion, it is possible to easily separate the separate member and polish or replace the separate member when the blade provided in both side edges in the circumferential direction and the inner peripheral edge of the lower end surface of the protrusion portion 33 is worn out. When the blade is a right-angled blade, surface grinding can be easily applied to polishing. By polishing, the corners of the blade can be edged. Alternatively, the blade of the protrusion portion 33 can be replaced with another blade having an edge if necessary. At least one of the shape and the material of the protrusion portion (blade) 33 is set in response to the physical characteristics (material and heat treatment) of the hub body 22z. For example, an optimum blade can be attached to the protrusion portion 33 in response to the physical characteristics of the hub body 22z.

Further, when a positioning convex portion protruding downward is formed in the lower surface of the pressing punch 30 separately from the protrusion portion 33, a positioning concave portion protruding outward in the axial direction is formed in the axial inner end surface 34 of the inner race 21 separately from the engagement concave portion 26, and the positioning convex portion and the positioning concave portion engage with each other while the pressing surface 31 of the pressing punch 30 is in contact with the axial inner end surface 34 of the inner race 21, the phases in the circumferential direction between the inner race 21 and the pressing punch 30 can be allowed to coincide with each other. In this case, it is preferable to regulate the dimension of each portion so that a gap exists between the lower end surface of the protrusion portion 33 and the bottom surface of the engagement concave portion 26 when the front end surface (the lower end surface) of the positioning convex portion comes into contact with the bottom surface (the surface facing the inside of the axial direction) of the positioning concave portion while the pressing surface 31 of the pressing punch 30 is in contact with the axial inner end surface 34 of the inner race 21.

Figure 6:
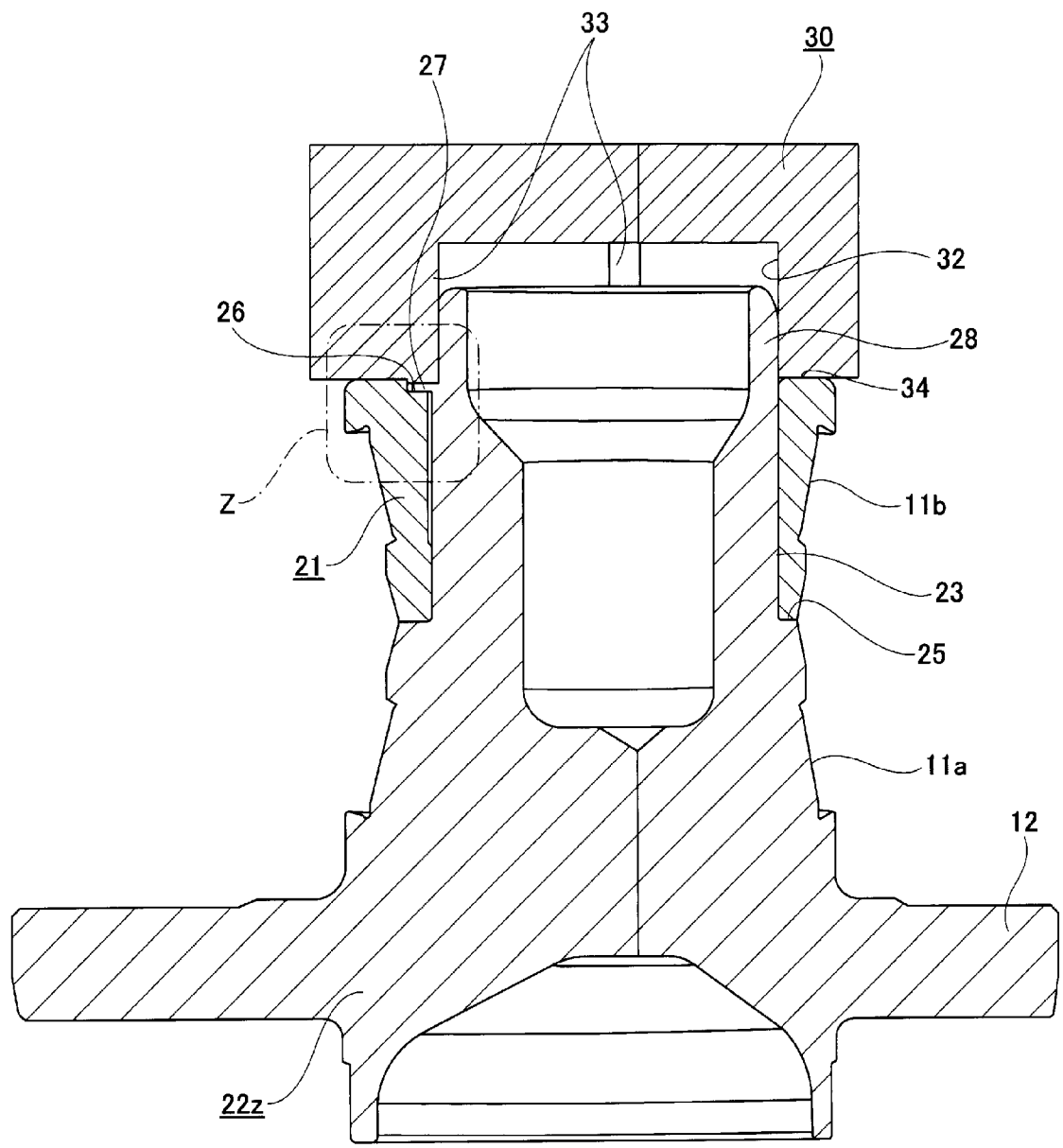
FIG. 6 is a view corresponding to a cross-section X-X of FIG. 2, which shows a state in which the pressing punch is further displaced downward from the state shown in FIG. 4 so that a press-fitting step and an engaging step are performed at the same time.

Next, as shown in FIGS. 4 to 6, a press-fitting step and an engaging step are performed at the same time. In the press-fitting step, the pressing punch 30 is further lowered so that the inner race 21 is press-fitted into the fitting cylinder portion 23 of the hub body 22z. The inner race 21 and the hub body 22z are combined (assembled, fitted) in the axial direction. In the engaging step, the engagement convex portion 27 is allowed to engage with the engagement concave portion 26 while forming the engagement convex portion 27 by forming a concave groove 29z. In the initial stage of the axial relative movement between the pressing punch 30 and the hub body 22z, (a) the pressing surface 31 of the pressing punch 30 comes into contact with the inner race 21, (b) at least a part of the protrusion portion (blade) 33 of the pressing punch 30 is disposed inside the engagement concave portion 26 of the inner race 21, and (c) an axial gap is provided between the protrusion portion (blade) 33 and the inner surface of the engagement concave portion 26 (FIG. 5). In accordance with the axial relative movement between the pressing punch 30 and the hub body 22z, the axial relative movement of the pressing punch (auxiliary member) 30 and the hub body 22z is performed. That is, the axial inner end surface 34 of the inner race 21 is pressed outward (downward) in the axial direction by the pressing surface 31 until the outer end surface of the inner race 21 in the axial direction collides with the step surface 25. Accordingly, the inner race 21 is press-fitted into the fitting cylinder portion 23 of the hub body 22z. At the same time, a plurality of positions in the circumferential direction of the radial outer portion of the cylindrical portion 28 of the hub body 22z are pressed outward in the axial direction by the lower end surface of the protrusion portion 33 to be plastically deformed (so that a protruding process (local shaving process) is performed). As shown in FIG. 7, an extra thickness generated as a result of forming the concave groove 29z is crushed between the lower end surface of the protrusion portion 33 and the bottom surface of the engagement concave portion 26 and the engagement convex portion 27 protruding outward in the radial direction is formed at a plurality of positions in the circumferential direction of the axial inner end portion of the fitting cylinder portion 23. Further, the engagement convex portion 27 is disposed inside the engagement concave portion 26 of the inner race 21 and the engagement convex portion 27 engages with the engagement concave portion 26. That is, a part of the hub body 22z deformed (shaved, partially shaved) by the protrusion portion (blade) 33 of the pressing punch 30 in the axial relative movement between the pressing punch 30 and the hub body 22z is disposed inside the engagement concave portion 26 of the inner race 21. Accordingly, the creep (displacement) between the inner race 21 and the hub body 22z is prevented. In an example, as shown in FIG. 7, a gap exists between the pressing surface 31 and the axial inner end surface 34 of the inner race 21 in a completed state of the press-fitting step and the engaging step in which the pressing punch 30 is lowered to a bottom dead center. However, the pressing surface 31 and the axial inner end surface 34 of the inner race 21 can be brought into contact with each other in the completed state of the press-fitting step and the engaging step. Additionally, a groove (processed groove, processing mark) 29z opening to the axial inner end surface is formed in a portion in which the phase in the circumferential direction in the outer peripheral surface of the cylindrical portion 28 coincides with that of the engagement convex portion 27 as the engagement convex portion 27 is formed by a protruding process (local shaving process). In addition, the inner race 21 can be press-fitted into the hub body 22z with a relatively light force (light press-fitting). This is because the displacement between the inner race 21 and the hub body 22 is suppressed by the engagement convex portion 27. For example, the press-fitting margin can be set to a value close to zero.

Figure 8:
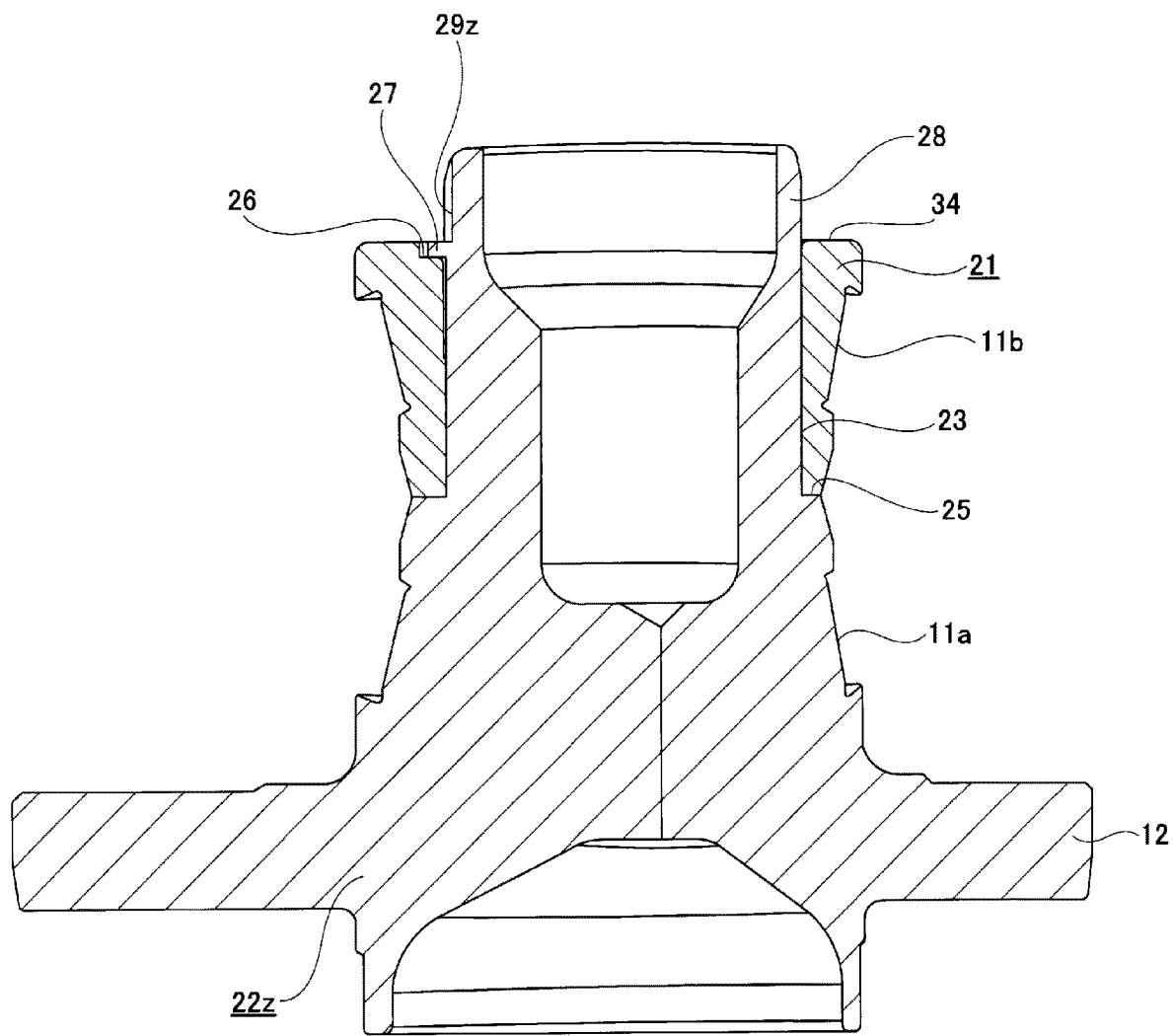
FIG. 8 is a view corresponding to a cross-section X-X of FIG. 2, which shows a state after the press-fitting step and the engaging step are completed.

Next, as shown in FIGS. 6 to 8, the pressing punch 30 is raised (retracted). Then, it is confirmed whether or not the engagement concave portion 26 of the inner race 21 engages with the engagement convex portion 27 of the hub body 22z with naked eyes or diagnosing images photographed by a camera.

When the engagement concave portion 26 and the engagement convex portion 27 engage with each other, as shown in FIG. 10, the staking portion 24 is formed by plastically deforming the cylindrical portion 28 of the hub body 22z outward in the radial direction. In this way, the hub unit bearing 1 of this example is obtained by processing the hub body 22z into the hub body 22 and coupling and fixing the inner race 21 and the hub body 22 to each other.

Additionally, various methods known from the past can be used for the method of processing the cylindrical portion 28 into the staking portion 24. For example, a die having a center axis inclined with respect to the center axis of the hub body 22z supported by the support base is pressed against the cylindrical portion 28. In this state, the staking portion 24 can be formed by swaging in which the die is swung around the center axis of the hub body 22z like a locus of the center axis due to precession. Alternatively, the staking portion 24 may be formed by flat-pressing in which a mold is pressed in the axial direction.

Further, the process of manufacturing the hub unit bearing 1 can be changed in order as appropriate or changed to be carried out simultaneously or separately as long as there is no contradiction. That is, for example, when the inner race 21 is press-fitted into the fitting cylinder portion 23 of the hub body 22z and a plurality of positions in the circumferential direction of the radial outer portion of the cylindrical portion 28 of the hub body 22z is subjected to a protruding process (local shaving process), the engagement convex portion 27 can engage with the engagement concave portion 26 of the inner race 21 while forming the engagement convex portion 27.

In the hub unit bearing 1 of this embodiment, since the engagement concave portion 26 of the inner race 21 engages with the engagement convex portion 27 of the hub body 22, it is possible to reliably prevent creep from occurring between the inner race 21 and the hub body 22.

Further, in this embodiment, it is possible to satisfactorily ensure the bearing performance of the hub unit bearing 1. That is, when the axial inner end surface of the inner race is strongly pressed by the staking portion in order to prevent the creep between the hub body and the inner race, the inner race is elastically deformed so that the inner race track on the inside of the axial direction expands. In contrast, in this embodiment, since the creep between the inner race 21 and the hub body 22 is prevented due to the engagement between the engagement concave portion 26 of the inner race 21 and the engagement convex portion 27 of the hub body 22, there is no need to excessively increase a force in which the axial inner end surface 34 of the inner race 21 is held down by the staking portion 24 to prevent the occurrence of creep. That is, the staking portion 24 may suffice to hold the axial inner end surface 34 of the inner race 21 with a force sufficient to prevent the inner race 21 from being displaced inward in the axial direction. Therefore, the elastic deformation amount of the inner race 21 can be suppressed to be small and the bearing performance can be satisfactorily ensured. Further, since there is no need to excessively increase a force in which the staking portion 24 holds down the axial inner end surface 34 of the inner race 21 and the processing load when forming the staking portion 24 can be suppressed to be small, a processing machine can be decreased in size.

Further, in this example, the engagement convex portion 27 engages with the engagement concave portion 26 opening to the axial inner end surface 34 of the inner race 21 and the inner peripheral surface of the axial inner end portion. Thus, it is possible to easily confirm whether or not the engagement concave portion 26 engages with the engagement convex portion 27 in the state before forming the staking portion 24, that is, whether or not creep between the inner race 21 and the hub body 22z is reliably prevented with naked eyes or diagnosing images photographed by a camera. Therefore, it is possible to suppress the occurrence of defective products and improve the yield.

Additionally, in this example, each of the engagement concave portion 26 and the engagement convex portion 27 is formed at four positions, but the number of the engagement concave portions and the engagement convex portions is not particularly limited and can be one to three or five or more as long as the creep between the inner race and the hub body can be prevented. Further, the shapes and dimensions of the engagement concave portion 26 and the engagement convex portion 27 are not particularly limited as long as the creep between the inner race and the hub body can be prevented, the engagement convex portion can be formed by a protruding process (local shaving process), and the strength and rigidity of the inner race and the hub body can be sufficiently ensured.

The rolling elements 4a and 4b are not limited to tapered rollers. Balls can also be used as the rolling elements 4a and 4b. Further, in the present invention, the hub body 9a is not limited to a hub unit bearing for a solid driven wheel, but can be also applied to a hub unit bearing for a drive wheel having an engagement hole such as a spline hole for engaging a drive shaft enabling torque transmission in the center of the hub body.

Figure 11A:
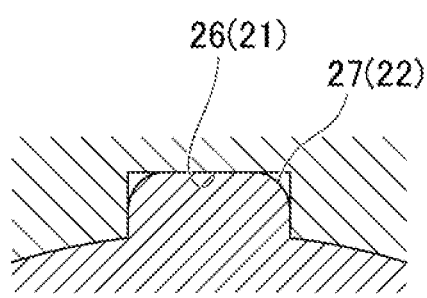
FIG. 11(a) to FIG. 11(d) are schematic horizontal cross-sectional views showing an engagement concave portion of an inner race and an engagement convex portion of a hub body.
Figure 11B:
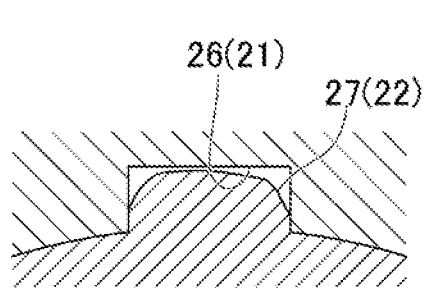
Figure 11C:
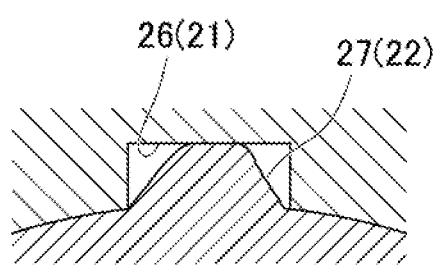
Figure 11D:
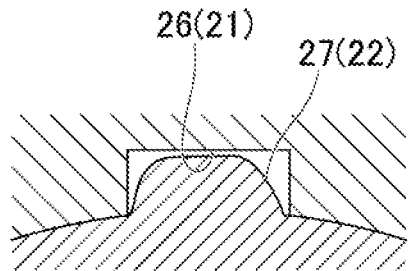

FIG. 11(a) to FIG. 11(d) are schematic horizontal cross-sectional view showing the engagement concave portion 26 of the inner race 21 and the engagement convex portion 27 of the hub body 22. In the example of FIG. 11(a), the convex portion 27 contacts the wall surface of the concave portion 26 in the radial direction and the circumferential direction. In the example of FIG. 11(b), the convex portion 27 contacts the wall surface of the concave portion 26 in the circumferential direction. There is a gap between the wall surface of the concave portion 26 and the convex portion 27 in the radial direction. In the example of FIG. 11(c), the convex portion 27 contacts the wall surface of the concave portion 26 in the radial direction. There is a gap between the wall surface of the concave portion 26 and the convex portion 27 in the circumferential direction. In the example of FIG. 11(d), the convex portion 27 is formed such that a gap exists between the wall surface of the concave portion 26 and the convex portion 27 in the radial direction and the circumferential direction. When the contact area of the wall surface of the concave portion 26 and the convex portion is large, the displacement between the inner race 21 and the hub body 22 is reliably prevented. When the contact area of the wall surface of the concave portion 26 and the convex portion is small, an excessive stress is prevented. Additionally, the convex portion 27 formed by a protruding process (local shaving process) can have a higher hardness than other portions of the hub body 22.

Figure 12:
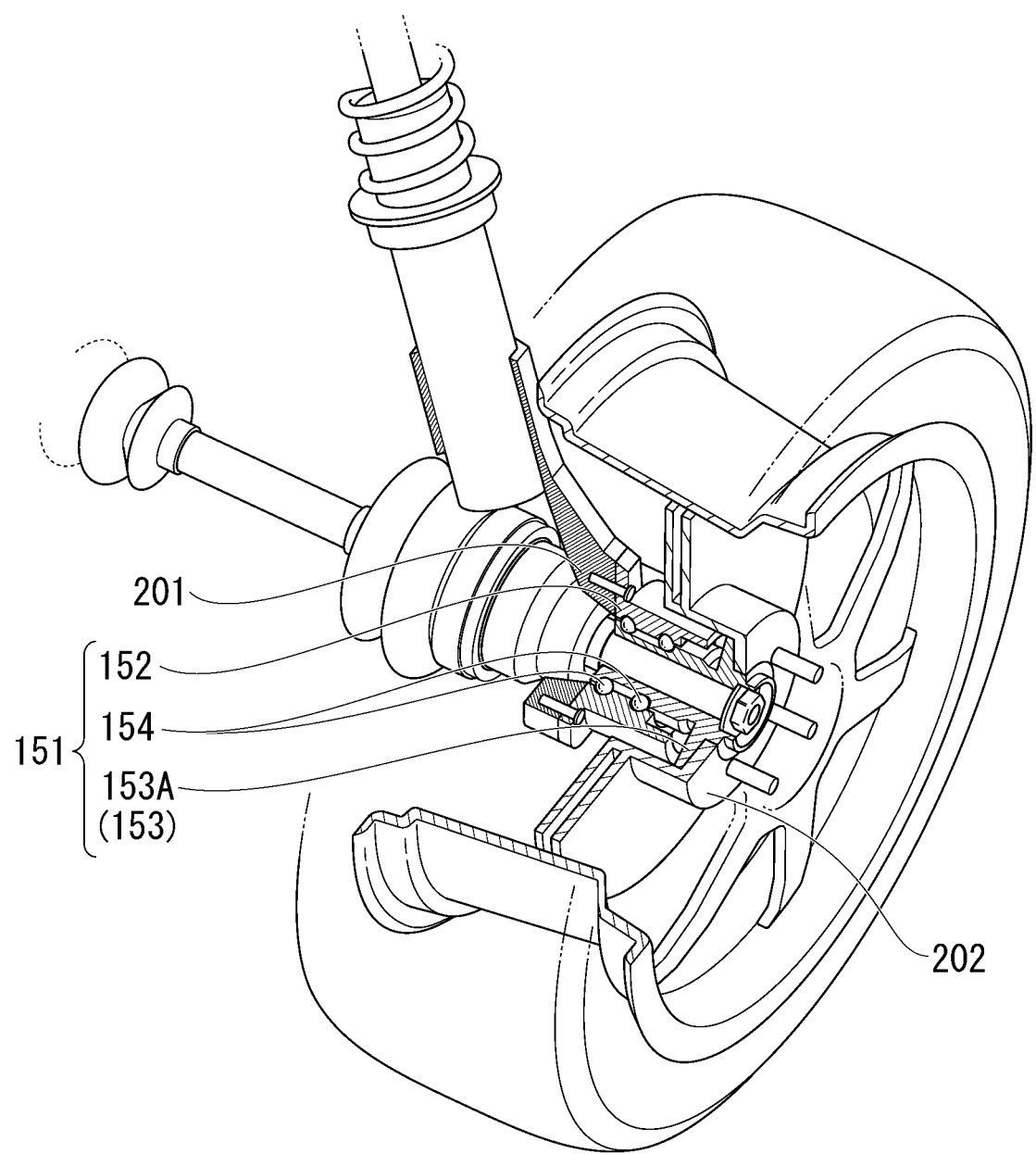
FIG. 12 is a partial schematic view of a vehicle including a hub unit bearing (bearing unit).
Figure 13:
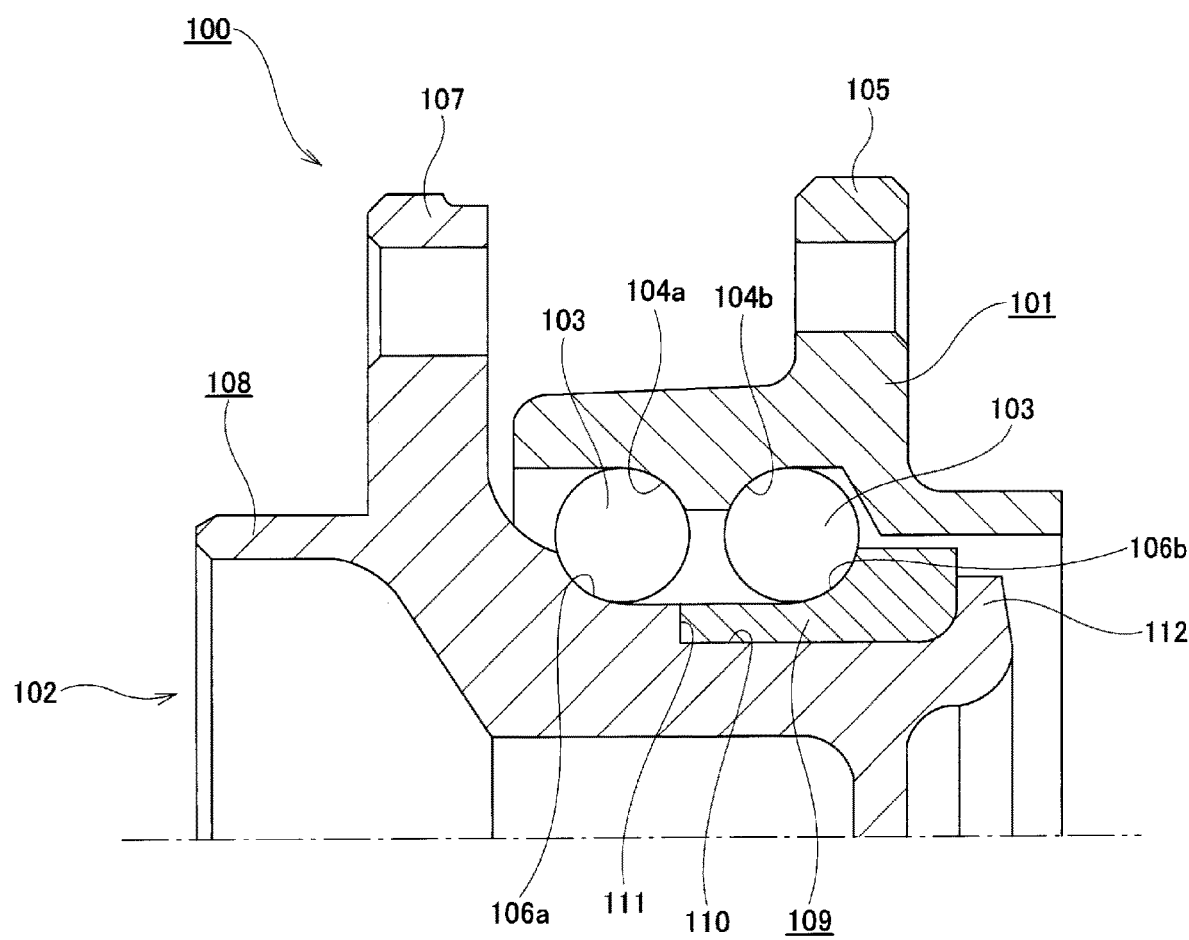
FIG. 13 is a cross-sectional view showing an example of a conventional structure of a hub unit bearing.

FIG. 12 is a partial schematic view of a vehicle 200 including a hub unit bearing (bearing unit) 151. The present invention can be applied to any one of a hub unit bearing for a drive wheel and a hub unit bearing for a driven wheel. In FIG. 12, a hub unit bearing 151 is for a drive wheel and includes an outer race 152, a hub 153, and a plurality of rolling elements 156. The outer race 152 is fixed to a knuckle 201 of a suspension device by a bolt and the like. A vehicle wheel (and a braking rotation body 22) 202 is fixed to a flange (rotational flange) 153A provided in the hub 153 using a bolt and the like. Further, the vehicle 200 can have the above-described support structure for the hub unit bearing 151 for a driven wheel.

The present invention is not limited to the hub of the hub unit bearing and can be also applied to other staking assemblies (staking units) in which a first member and a second member having a hole into which the first member is inserted are combined.

REFERENCE SIGNS LIST

1 Hub unit bearing
2 Outer race
3 Hub (staking assembly, staking unit)
4a, 4b Rolling element
5a, 5b Outer race track
6 Stationary flange
7 Support hole
8 Knuckle
9 Passage hole
10 Bolt
11a, 11b Inner race track
12 Rotational flange
13 Attachment hole
14 Braking rotation body
15 Stud
16 Passage hole
17 Wheel
18 Passage hole
19 Nut
20a, 20b Cage
21 Inner race (second member)
22, 22z Hub body (first member)
23 Fitting cylinder portion
24 Staking portion
25 Step surface
26 Engagement concave portion (concave portion)
27 Engagement convex portion
28 Cylindrical portion
29, 29z Concave groove (groove, processed groove, processing mark)
30 Pressing punch (auxiliary member)
31 Pressing surface
32 Concave portion
33 Protrusion portion (blade)
34 Axial inner end surface
100 Hub unit bearing
101 Outer race
102 Hub
103 Rolling element
104a, 104b Outer race track
105 Stationary flange
106a, 106b Inner race track
107 Rotational flange
108 Hub body
109 Inner race
110 Fitting cylinder portion
111 Step surface
112 Staking portion
120 Hole
126 Bottom surface (first surface)
127 Facing surface (second surface)

What is claimed is:

1. A method of manufacturing a staking assembly comprising:
preparing a first member, a second member including an engagement concave portion and a hole allowing the first member to be inserted thereinto, and an auxiliary member including a protrusion portion;
combining the first member and the second member with each other in an axial direction;
moving the auxiliary member and the first member relatively in an axial direction so that a part of the first member is deformed by the protrusion portion of the auxiliary member by the axial relative movement and is disposed inside the engagement concave portion of the second member; and
forming a staking portion with respect to the second member in the first member,
wherein the combining of the first member and the second member is performed by the relative movement in the axial direction between the auxiliary member and the first member, and
after the part of the first member is disposed inside the engagement concave portion of the second member, the staking portion of the first member is formed with respect to the second member by using a die that is different from the auxiliary member.

2. The method of manufacturing a staking assembly according to claim 1,
wherein the auxiliary member includes a pressing surface, and
wherein in the relative movement between the auxiliary member and the first member, (a) the pressing surface of the auxiliary member comes into contact with the second member, (b) at least a part of the protrusion portion of the auxiliary member is disposed inside the engagement concave portion of the second member, and (c) an axial gap is provided between the protrusion portion and an inner surface of the engagement concave portion.

3. The method of manufacturing a staking assembly according to claim 1,
wherein the protrusion portion is positioned relative to a position of the engagement concave portion of the second member in a circumferential direction before the relative movement between the auxiliary member and the first member.

4. The method of manufacturing a staking assembly according to claim 1,
wherein at least one of a shape and a material of the protrusion portion is set in response to physical characteristics of the first member.

5. The method of manufacturing a staking assembly according to claim 1,
wherein the combining of first member and the second member is performed by a light press-fitting due to the relative movement in the axial direction between the auxiliary member and the first member.

6. A method of manufacturing an automobile that includes a staking assembly, the method comprising:
manufacturing the staking assembly by the method of claim 1; and
assembling a hub unit bearing including the staking assembly to a vehicle body.

* * * * *